July 13, 1954 A. K. DIESEN 2,683,773

SWITCHING DEVICE COMPRISING PRIMARY AND SECONDARY CROSSBAR SWITCHES

Filed May 10, 1950 4 Sheets-Sheet 1

Inventor
A. K. Diesen
By Glascock Downing & Seebold
Attys.

Inventor
A. K. Diesen
By Glascock Downing & Seebold
Attys.

Inventor
A. K. Diesen
By Glascock Downing & Seebold
Attys.

July 13, 1954

Filed May 10, 1950

A. K. DIESEN

SWITCHING DEVICE COMPRISING PRIMARY AND SECONDARY CROSSBAR SWITCHES 2,683,773

4 Sheets-Sheet 4

Inventor
A. K. Diesen
By Glascock Downing Seebold
Attys.

Patented July 13, 1954

2,683,773

UNITED STATES PATENT OFFICE 2,683,773

SWITCHING DEVICE COMPRISING PRIMARY AND SECONDARY CROSSBAR SWITCHES

Anton Kristian Diesen, Stockholm, Sweden, assignor to Telefonaktiebolaget L M Ericsson, Stockholm, Sweden, a company of Sweden Application May 10, 1950, Serial No. 161,144

Claims priority, application Sweden May 20, 1949

2 Claims. (Cl. 179—22)

The present invention relates to automatic telephone systems with selecting units comprising primary and secondary cross bar switches and markers. In such systems connections through two selecting units connected in series may be arranged over any one of a plurality of connecting paths through the first selecting unit and over any one of a plurality of connecting paths through the second selecting unit. For each connecting path there are test circuits, which indicate if the connecting path is free and with help of which a marker can select and set a connection between a calling line connected to the one selecting unit and a called line or a line within a called group of lines connected to the other selecting unit. It is in this connection desirable that the marker can test all possible combinations of connecting paths through the two selecting units. The object of the invention is to achieve this in a simple manner.

The invention is characterized by a relay device in the marker, which successively operates connecting relays connecting together test wires for connecting paths through said first selecting unit with test wires for connecting paths through said second selecting unit, whereby each connecting relay only connects one test wire for connecting paths through said first selecting unit at a time from each secondary cross bar switch in this selecting unit. Said relay device is thereby controlled by a test device, which interrupts the successive connection, when a group of connecting paths is connected that contains at least one connecting path, over which the communication can be set.

The invention will be described more closely with reference to the accompanying drawings Figs. 1–5.

Figures 4, 5:
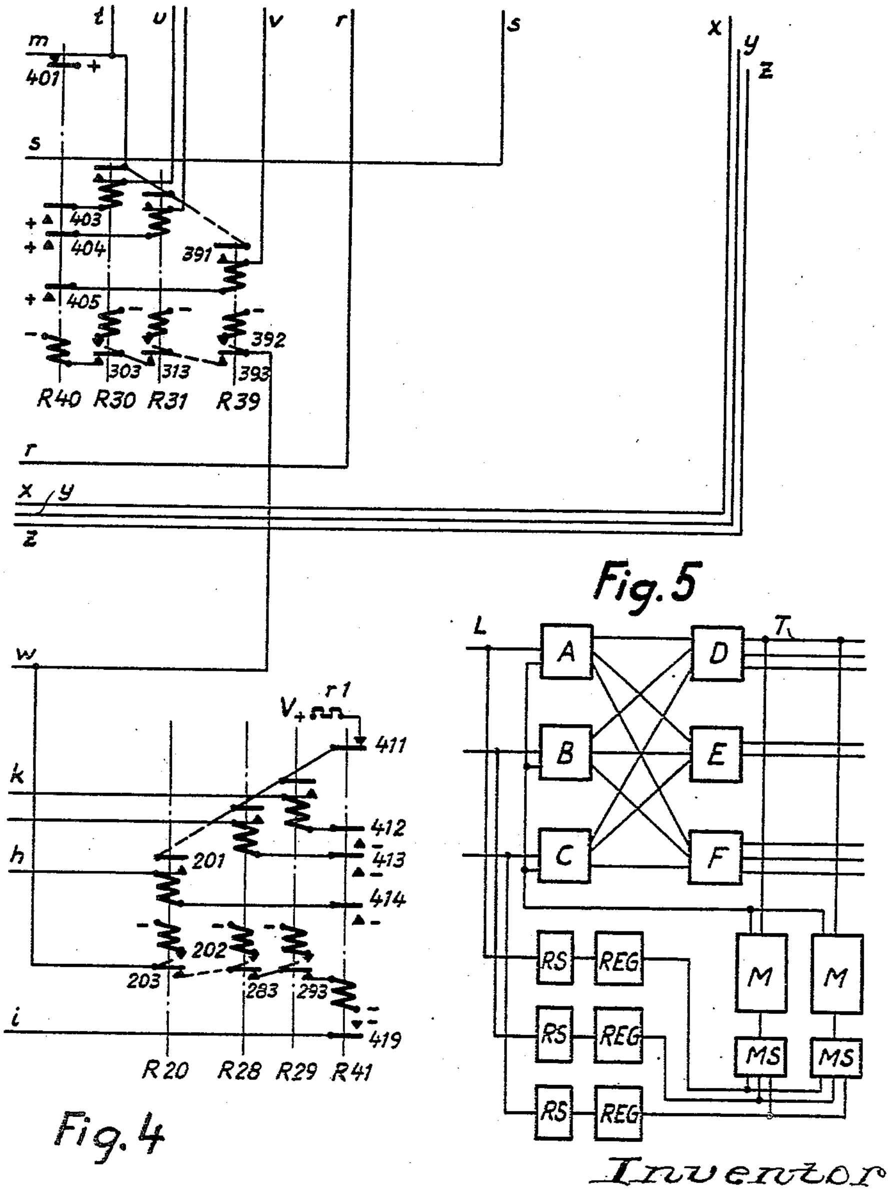
Fig. 5 is a general diagram.

On the general diagram according to Fig. 5, A, B and C are selecting units comprising primary and secondary cross-bar switches, to which incoming lines L are connected, whilst D, E and F are selecting units, to which outgoing lines T are connected. The incoming lines can be connected over register finders RS to registers REG, which are set by signals from the connected line so that an outgoing line T or a group of outgoing lines is marked. After a register REG has been set, it connects itself over a selector MS to a marker M. Each selecting unit A–C has its own group of registers REG, and therefore the marker can receive signals from the register indicating from which one of the selecting units A–C the call is coming and to which one of the selecting units D–F the call is directed. The marker connects both said selecting units to the marker, and since there are direct links between each one of the selecting units A–C and each one of the selecting units D–F, the marker can set a connection between the calling line L and a called line T simultaneously with other markers setting connections between other selecting units.

Figure 1:
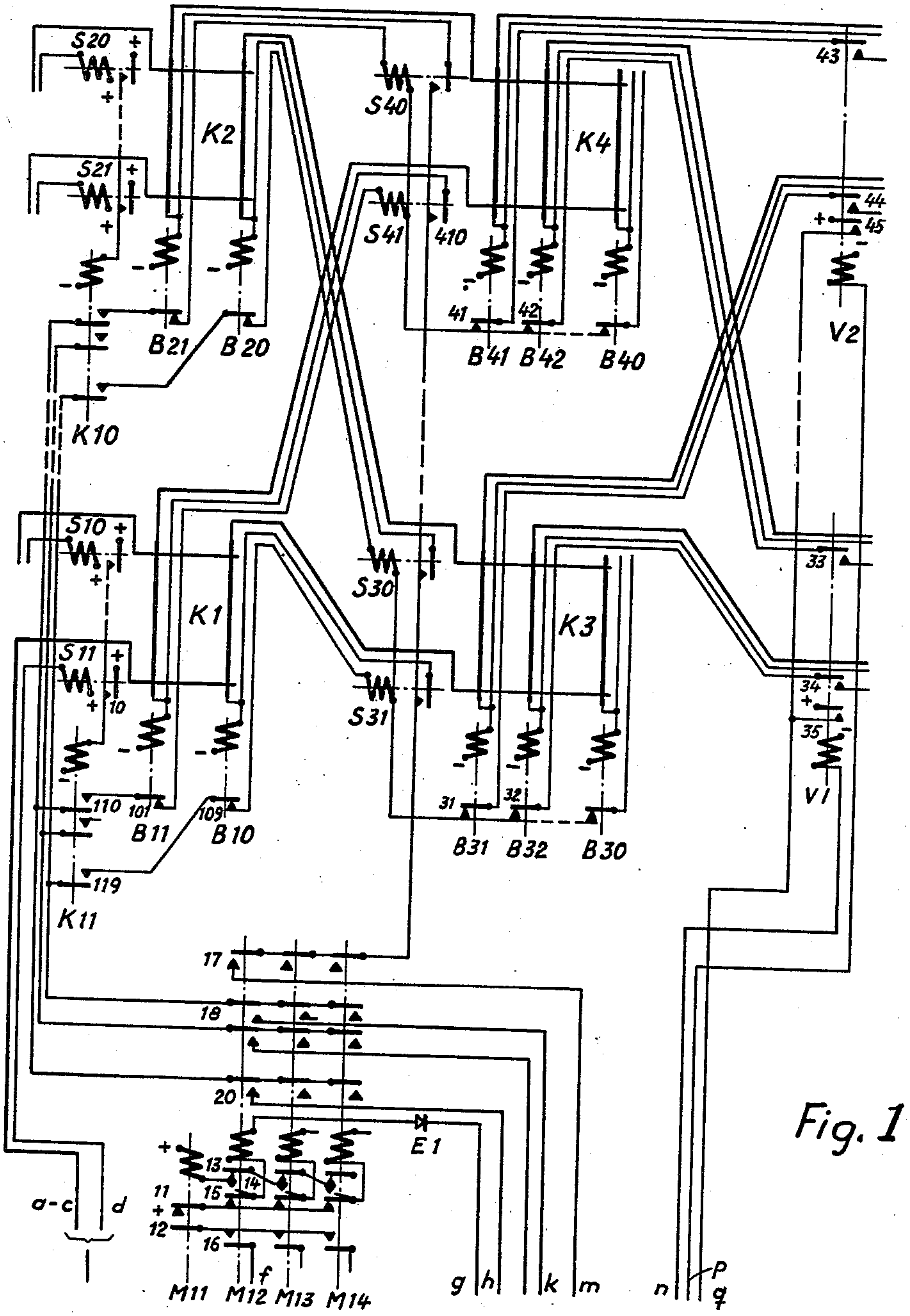
Figs. 1–2 show selecting units with primary and secondary cross-bar switches.
Figure 2:
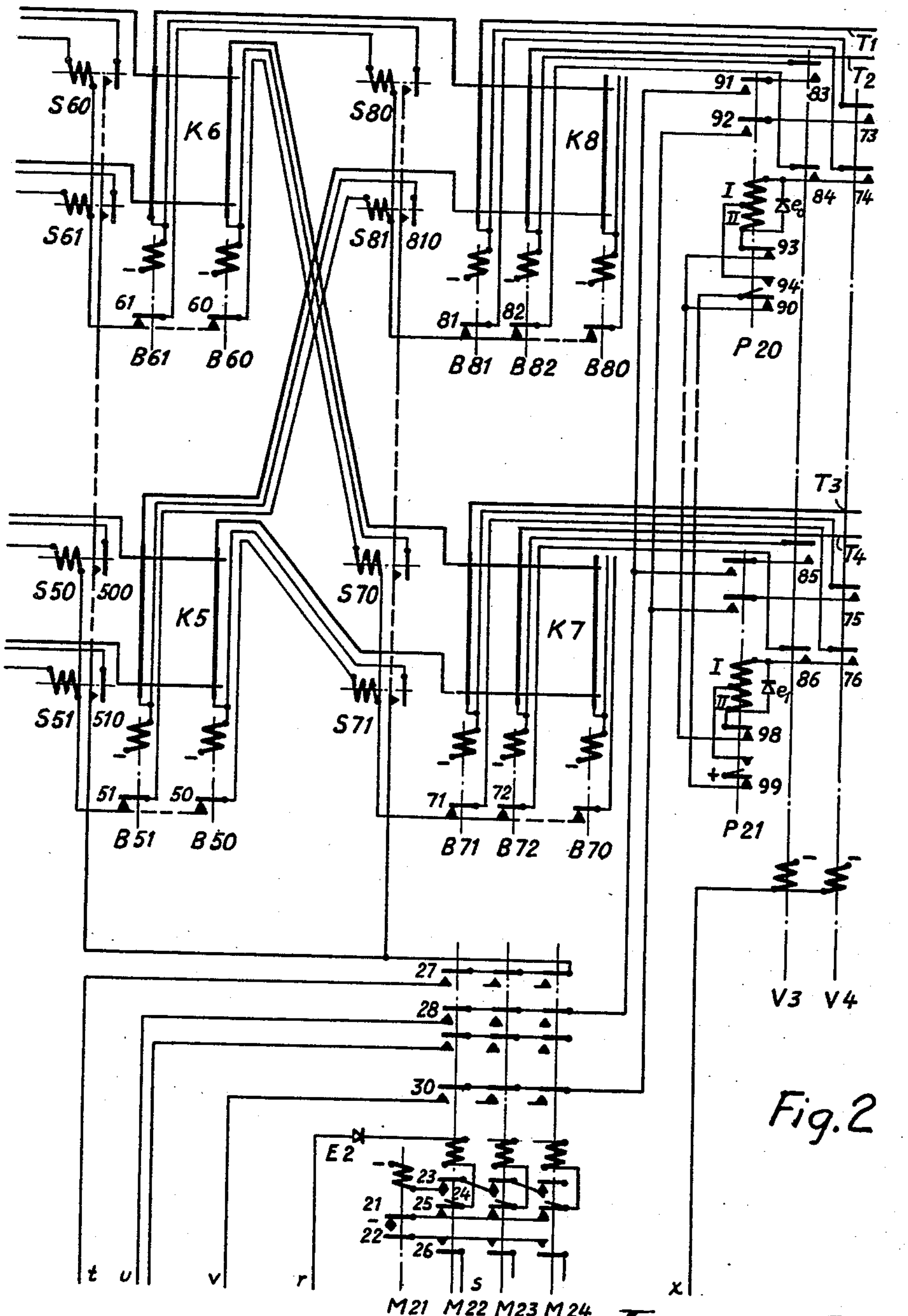
Figure 3:
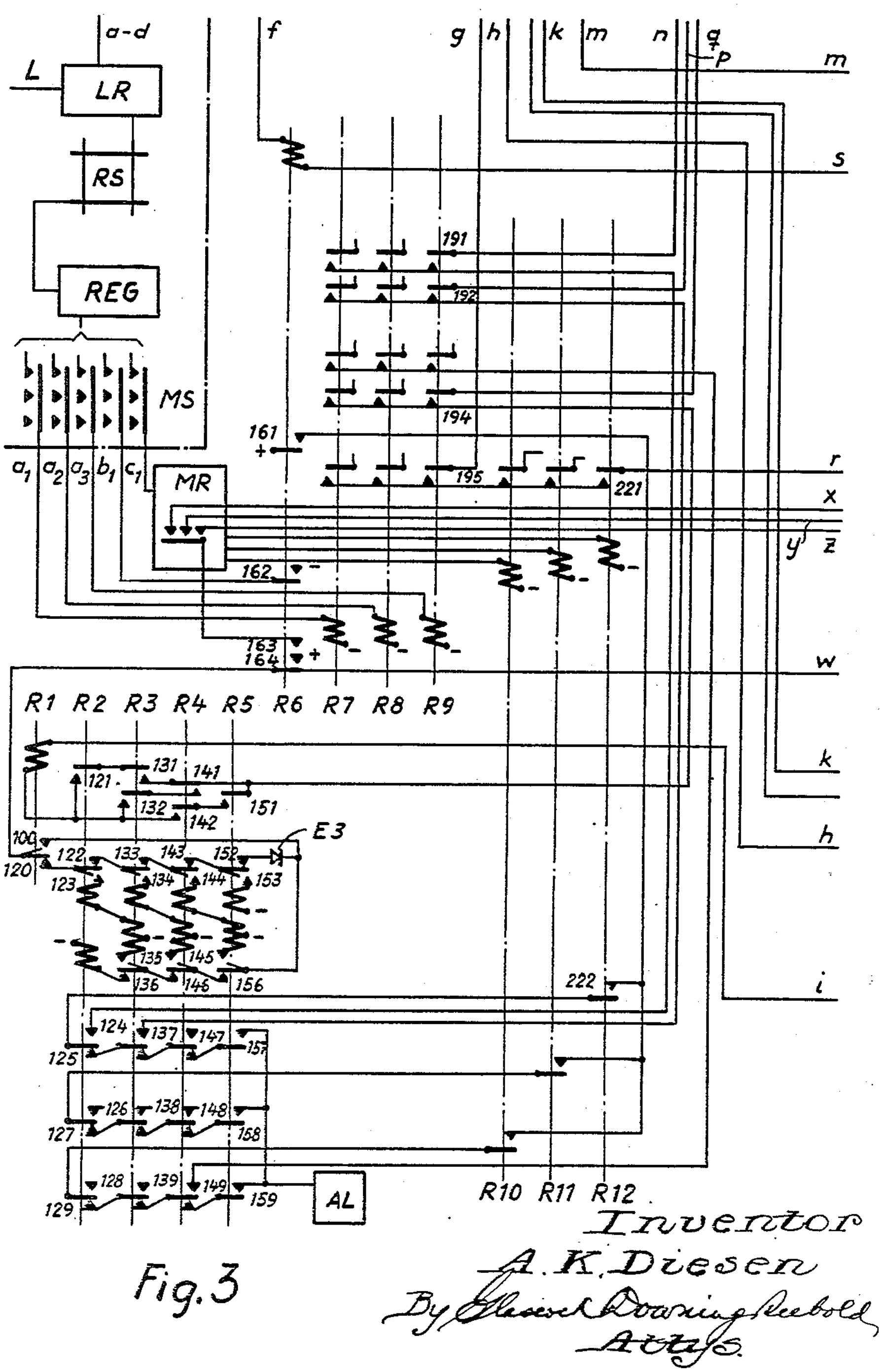
Figs. 3–4 show a marker.

Fig. 1 shows a selecting unit consisting of cross-bar switches K1—K4 for incoming lines and corresponding to A, B or C in Fig. 5. Connecting relays M12—M14 for three markers are comprised in Fig. 1. In Fig. 3, L is an incoming line and LR a relay set for the same line. The line L is over the wires *a–d* connected to the contacts in the cross-bar switch K1 in Fig. 1 corresponding to the selecting magnet S11. When a call comes in over line L the relay set LR is connected to a register REG over a register-finder RS. Signals thereafter come in over line L and set the register REG so, that the called line or group of lines is marked. Suppose now that a group of lines T1—T4 in Fig. 2 are called and a free line within said group is to be selected and connected with line L. The register REG is connected to a marker over a selector MS. The marker according to Figs. 3–4 comprises a registering device MR, which is set from the register REG and points out the called group of lines, and the selecting unit D, E or F in Fig. 5 comprising the called group of lines and shown in Fig. 2. One of the relays R10—R12, each of which pertains to a selecting unit for outgoing lines, is thereby operated. In the present case relay R12 is operated, which relay pertains to the selecting unit shown in Fig. 2. The contacts 221—222 are closed. One of the relays R7—R9 is simultaneously operated from the register REG over one of the contact rows *a1*—*a3*. Each of the relays pertains to a selecting unit for incoming lines. In this case relay R9 is operated, which pertains to the selecting unit shown in Fig. 1 and to which the calling line L is connected. The contacts 191—195 are closed. The following circuit is closed if the two selecting units in Figs. 1–2 are free: +, contacts 11 and 15, winding on relay M12, rectifier E1, wire *g*, contacts 195 and 221, wire *r*, rectifier E2, winding on relay M22, contacts 25 and 21 to negative. Relays M12 and M22 attract their armatures. Contacts 13—20 and 23—30 are operated. The circuit is switched by contacts 14 and 24 to relays M11 and M21, which operate. Contacts 11—12 and 21—22 are operated. The selecting units in Fig. 1 and Fig. 2 are thereafter marked busy and other markers corresponding to the relays M13—M14 and M23—M24 cannot be connected. The following circuit is closed: +, contacts 12 and 16, wire *f*, winding on relay R6, wire *s*, contacts 26 and 22, to negative. Relay R6 attracts its armature. The contacts 161—164 are closed. The following circuits are closed:

(1) The selecting magnet S11 in Fig. 1 is energized over contact 162, contact row *b1* in MS, register REG, RS and LR and wire *d*. Contact 110 is closed. Relay K11 operates. Contacts 110—119 are closed.

(2) Relays V3 and V4 in Fig. 2 are operated over contact 163, contacts in MR and wire *x* among the indicating wires *x*—*z*. Contacts 83—86 and 73—76 are closed and indicate which one of lines T1—T4 pertains to the called group of lines.

(3) Relay R41 is operated over contact 164, wire *w*, contacts 293—293. The contacts 411—419 are closed, the test relays R20—R29 thereby being connected over the wires *h*—*k* and contacts 18—20 to the test wires for the connecting paths which can reach line L through the selecting unit in Fig. 1.

(4) Relay R40 is simultaneously operated over wire *w* and contacts 303—393. The contacts 401—405 are operated.

(5) Relay R2 is also operated over contact 164 in the following circuit: +, contacts 164, 120, 122, 133, 143, 152, rectifier E3, contacts 156, 146 and 136, winding on relay R2 to negative.

The following circuit is closed: +, contacts 161, 222, 124 and 191, wire *n*, winding on relay V1 to negative. Relay V1 attracts its armature. Contacts 33—35 are operated. Simultaneously, relay R3 receives current over contact 123. Relay R3 operates and relay R2 is held. Contacts 131—139 are operated. The following circuit is closed: +, contact 35 in Fig. 1, wire *q*, contacts 194, 131 and 121, winding on relay R1, wire *i*, contact 419 to negative. Relay R1 operates. Contacts 100 and 120 are actuated. Relay R2 releases its armature whilst relay R3 is held in the following circuit: +, contacts 164, 100, 156, 146 and 135, winding on relay R3 to negative. When relay R2 released its armature, relay V1 released its armature and relay V2 was operated in a circuit over contacts 125 and 137. Contacts 43—45 in Fig. 1 are closed. When contact 121 opens, relay R1 releases its armature. Relay R4 now receives current over contacts 120, 122 and 134 and attracts its armature simultaneously with relay R3 being held. Contacts 141—149 are operated. Relay R1 is operated again, this time in a circuit over contact 45, wire *q*, contacts 194, 141 and 132. Relay R3 releases its armature when contact 120 is operated and relay R4 is held over contacts 100, 155 and 145. In this way relays V1—V2 are operated one after the other until all relays in the relay chain R2—R5 have been operated or relay R41 in Fig. 4 releases its armature, which takes place when a free connection between line L and one of the lines T1—T4 is found, whereby one of the relays R20—R29 attracts its armature.

In the relay chain R2—R5 each selecting unit for outgoing lines D–F in Fig. 5 has a row of contacts 125—147, 127—148 or 129—149. The wires coming from said contact rows can be connected to relays, V1—V2, in any of the selecting units for incoming lines, A–C in Fig. 5, over contacts, for example 191—194 on relays R7—R9. If the relay chain is passed without any free connection being found, relay R5 is actuated and a circuit is closed to an alarm device AL. Relay R5 is thereby held in a circuit over contact 153.

During the searching process, the following circuits are closed for the test relays R20—R29 when relay V1 operates: +, contacts 99—90 in Fig. 2, circuits connected in parallel over contacts 93—98, rectifiers *e0*—*e1*, contacts 84—, 74—86—76, 81—82, 71—72, selecting magnets S81—S71, contacts 51—50, selecting magnets S51—S59, contacts 34—33 in Fig. 1, 32—42, selecting magnets S31—S41, contacts 109—101, 119—110, 18—20, wires *h*—*k*, winding on relays R20—R29, contacts 414—412, to negative. If all the connecting means are free, all the relays R20—R29 operate. We suppose that at least relay R20 attracts its armature. The contacts 201—203 are operated. Relay R41 becomes currentless and releases its armature. All the test circuits are broken at contacts 412—414 and only the relay which is operated and lies first in the relay chain R20—R29 is held. In the present case relay R20 is held over contact 202. The following circuit is closed: from the positive pole on an auxiliary battery V+, resistance *r1*, contacts 411 and 201, wire *h*, contacts 20, 110 and 101, selecting magnet S41, contacts 42 and 33, selecting magnet S50, the circuits connected in parallel over contacts 51—50, selecting magnets S81—S71, contacts 81—82—71—72, 74—84—76—86, windings I and II on relays P20—P21, contacts 93—98, 90—99. The windings II on relays P20—P21 have such a high resistance, that none of the selecting magnets S50, S71 or S81 can be connected in series with them. Relays P20—P21 form a relay chain, in which only one relay at a time can be operated. We suppose that relay P20 attracts its armature but not relay P21. Contacts 90—94 are operated. The following circuit is closed: +, contacts 99 and 94, winding I on relay P20, the parallel circuits over contacts 84—74 and 82—81, selecting magnet S81, contact 51, selecting magnet S50, contacts 33 and 42, selecting magnet S41, contacts 101, 110 and 20, wire *h*, contacts 201 and 411, resistance *r1* to V+. Winding I on relay P20 has a low resistance, wherefore the selecting magnets S81, S50 and S41 attract their armatures. The contacts 810, 510 and 410 are closed.

When relay P20 attracts its armature the selecting magnets B81—B82 are connected to the test relays R30—R39, whereby the following parallel circuits are closed: +, contacts 403—405 in Fig. 4, windings on relays R30—R39, wires *u*—*v*, contacts 28—30, 91—92, 83—73, operating magnets B82—B81, to negative. Said windings on relays R30—R39 have such a high resistance that the operating magnets B81—B82 have not yet been operated.

All the operating magnets in the cross-bar switches K1—K8 are held during a call over one of the multiple contacts which are closed, when the operating magnet attracts its armature. This is indicated in Figs. 1–2 by a connection between each operating magnet and the thick line which, in the symbol for a cross-bar switch, represents the multiple field of the operating magnet. When one of the operating magnets B71—B72 and B81—B82 is busy, + is connected to the winding of the operating magnet, wherefore none of the relays R30—R39, which at testing are connected to a busy operating magnet, can be operated. Those of relays R30—R39, which are connected to a free operating magnet, on the other hand, operate. We suppose that at least relay R39 attracts its armature. The contacts 391—393 are operated. Relay R40 releases its armature and the contacts 403—405, disconnect the operating circuits for relays R30—R39, all of which, except R39, release their armatures. Relay R39 is held over contact 392. During the operating time for relay R39 and the release time for relay R40, the selecting magnets S81, S50 and S41 have completed their operation, and the corresponding operating magnets B51, B42, and B11 now simultaneously attract in the following circuits: +, contact 401, wires *m* and *t*, contacts 17 and 27, 410, 500 and 810, operating magnets B11, B42, and B51, to negative. Simultaneously, operating magnet B71 is also operated in the following circuit: +, contact 401, contact 391, wire *v*, contacts 30, 92 and 73, operating magnet B81, to negative.

The operating magnets B81, B51 and B42 and B11 are held over their own contacts in series with one of the wires *a*–*c* in Fig. 1. Such a switching process thereby takes place in the line equipment LR, that the register REG and the marker are released. A communication is thereafter connected between the line L and the line T1 in Fig. 2 over the operating magnets B11, B42, B51 and B81.

If relay V1 in Fig. 1 does not connect any free path to the marker, relay V2 will connect a number of new circuits corresponding to the operating magnets B31—B41 instead of the operating magnets B32—B42 in the above description. Thus, it is achieved, that all the possible connecting paths through the selecting unit in Fig. 1 are tested and when one of the test relays R20—R29 in Fig. 4 operates, a free path is didirectly selected through said selecting unit, which can reach at least one line within the called group of lines. The choice of connection path through the selecting unit in Fig. 2 is then effected similarly to the description above.

I claim:

1. In an automatic telephone system, a first selecting unit, a second selecting unit, each of said selecting units comprising primary and secondary cross bar switches connected by links, a calling line connected to a primary cross bar switch in the first selecting unit, a called group of lines connected to the secondary cross bar switch in the second selecting unit, a marking relay for said called group of lines for marking links in said selecting unit connectable to idle lines in said group, at least two groups of trunks each comprising a single trunk from each secondary cross bar switch in the first selecting unit for connecting the secondary cross bar switches in said first selecting unit to the primary cross bar switches in said second selecting unit, a test circuit including a test conductor and a make contact for each of said trunks, an operating relay for said make contacts for each of said groups of trunks, a register, means connecting the calling line to the register and setting the latter in accordance with the telephone number designating the called group of lines, a marker including registering means, operating means and testing means, a marker selector connecting said register to said marker and through which the register transmits signals to the marker for designating the first selecting unit and said called group of lines for setting said registering means in accordance with said signals, a plurality of test conductors extending from said testing means in the marker, operating conductors extending from said operating means in the marker, and a marking conductor extending from said registering means in the marker, connecting means operated by said registering means connecting said test conductors to said links in said first selecting unit, said operating conductors to said operating relays, and said marking conductors to said marking relay, whereby said registering means actuates said marking relay and starts said operating means which selectively actuates said operating relays one at a time, and whereby said testing means stops said operating means upon closure of said make contacts for a group of trunks containing at least one idle trunk over which said called line can be connected to a line within said called group of lines.

2. In an automatic telephone system, a first selecting unit, a second selecting unit, each of said selecting units comprising primary and secondary cross bar switches connected by links, a calling line connected to a primary cross bar switch in the first selecting unit, a called group of lines connected to the secondary cross bar switch in the second selecting unit, a marking relay for said called group of lines for marking links in said selecting unit connectable to idle lines in said group, at least two groups of trunks each comprising a single trunk from each secondary cross bar switch in the first selecting unit for connecting the secondary cross bar switches in said first selecting unit to the primary cross bar switches in said second selecting unit, a test circuit including a test conductor and a make contact for each of said trunks, a register, an operating relay for said make contacts for each of said groups of trunks, means connecting the calling line to the register and setting the latter in accordance with the telephone number designating the called group of lines, a marker including registering means, operating means, and testing means, a marker selector connecting said register to said marker and through which the register transmits signals to the marker for designating the first selecting unit and said called group of lines for setting said registering means in accordance with said signals, a plurality of test conductors extending from said testing means in the marker, operating conductors extending from said operating means in the marker, and a marking conductor extending from said registering means in the marker, connecting means operated by said registering means for connecting said test conductors to said links in said first selecting unit, said operating conductors to said operating relays, and said marking conductor to said marking relay, whereby said registering means actuates said marking relay and starts said operating means which selectively actuates said operating relays one at a time, and whereby said testing means selects an idle link in said first selecting unit and a corresponding idle trunk over which said called line can be connected to a line within said called group of lines and stops said operating means in the position where said make contact for said selected trunk is closed.

References Cited in the file of this patent

UNITED STATES PATENTS

| Number | Name | Date |
|---|---|---|
| 2,034,883 | Scudder | Mar. 24, 1936 |
| 2,363,955 | Gillings | Nov. 28, 1944 |